US009030601B2

(12) United States Patent
Sato

(10) Patent No.: US 9,030,601 B2
(45) Date of Patent: May 12, 2015

(54) IMAGE PICKUP APPARATUS

(71) Applicant: Canon Kabushiki Kaisha, Tokyo (JP)

(72) Inventor: Yoichi Sato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/065,590

(22) Filed: Oct. 29, 2013

(65) Prior Publication Data

US 2014/0063305 A1 Mar. 6, 2014

Related U.S. Application Data

(63) Continuation of application No. 10/661,553, filed on Sep. 15, 2003, now Pat. No. 8,610,979.

(30) Foreign Application Priority Data

Sep. 19, 2002 (JP) ................................ 2002-273023

(51) Int. Cl.
  *H04N 1/42* (2006.01)
  *H04N 5/361* (2011.01)
  *H04N 3/14* (2006.01)
  *H04N 5/232* (2006.01)
  *H04N 9/04* (2006.01)
  *H04N 5/335* (2011.01)
  *H04N 101/00* (2006.01)

(52) U.S. Cl.
  CPC ............ *H04N 5/361* (2013.01); *H04N 3/1512* (2013.01); *H04N 5/232* (2013.01); *H04N 5/23241* (2013.01); *H04N 9/045* (2013.01); *H04N 2101/00* (2013.01); *H04N 5/335* (2013.01)

(58) Field of Classification Search
  USPC ........................... 358/513, 474, 514; 348/372
  See application file for complete search history.

(56) References Cited

U.S. PATENT DOCUMENTS 4,591,727 A 5/1986 Gaebelein et al.
5,812,191 A 9/1998 Orava et al.
(Continued)

FOREIGN PATENT DOCUMENTS

JP 03-286671 A 12/1991
JP 09-200633 A 7/1997
(Continued)

OTHER PUBLICATIONS

Jul. 25, 2006 Japanese Official Action in Japanese Patent Appln. No. 2002-273023.

*Primary Examiner* — Barbara Reinier
(74) *Attorney, Agent, or Firm* — Fitzpatrick, Cella, Harper & Scinto

(57) ABSTRACT

An image pickup apparatus in which a pixel area including arrangement of a plurality of pixels each having a photoelectric conversion portion and a common output portion for sequentially amplifying and outputting signals from the plurality of pixels included in the pixel area are formed on a single semiconductor substrate, comprises a power supply unit for effecting power supply control of the common output portion independently of control on power supply to the pixel area, and a control circuit for effecting control to supply no power to the common output portion in a predetermined period after starting photo charge accumulation in the photoelectric conversion portion and supply the power to the common output portion before the end of a photo charge accumulation period in the photoelectric conversion portion.

8 Claims, 13 Drawing Sheets

(56) References Cited

U.S. PATENT DOCUMENTS

| | | |
|---|---|---|
| 6,144,407 A | 11/2000 | Mizutani et al. |
| 6,163,024 A | 12/2000 | Kozuka et al. |
| 6,567,125 B1 | 5/2003 | Shimizu |
| 7,098,950 B2 | 8/2006 | Yamamoto et al. |
| 7,221,400 B2* | 5/2007 | Takahashi et al. ............ 348/350 |
| 2001/0052941 A1 | 12/2001 | Matsunaga et al. |
| 2002/0044211 A1* | 4/2002 | Tujii et al. .................... 348/302 |
| 2002/0089594 A1* | 7/2002 | Ishimoto ....................... 348/296 |
| 2003/0071906 A1 | 4/2003 | Matsumoto |
| 2005/0062865 A1 | 3/2005 | Shibazaki |
| 2006/0250513 A1 | 11/2006 | Yamamoto et al. |

FOREIGN PATENT DOCUMENTS

| | | |
|---|---|---|
| JP | 11-266399 A | 9/1999 |
| JP | 2001-094887 A | 4/2001 |
| JP | 2001-285723 A | 10/2001 |

\* cited by examiner

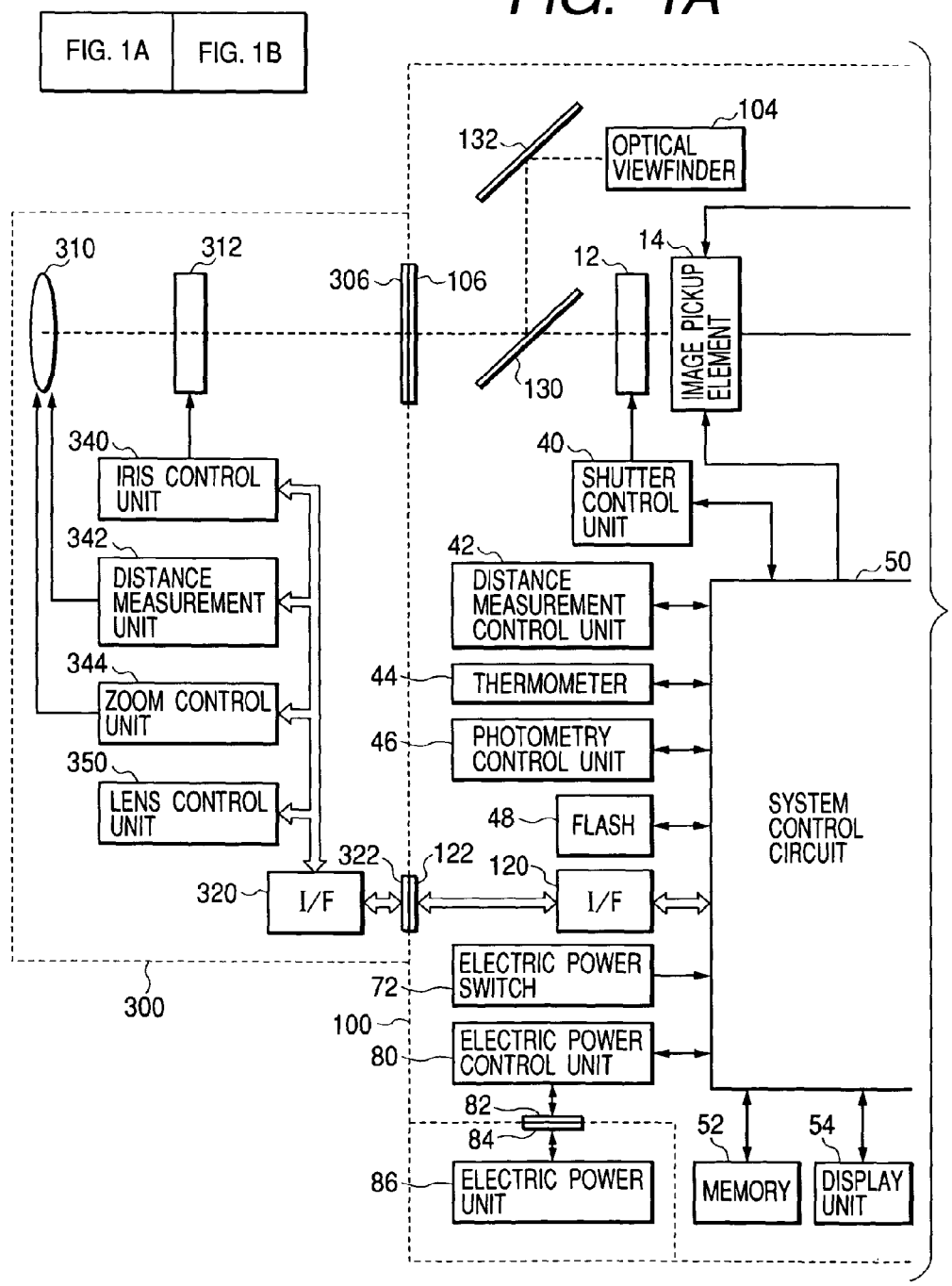

TO FIG. 8B

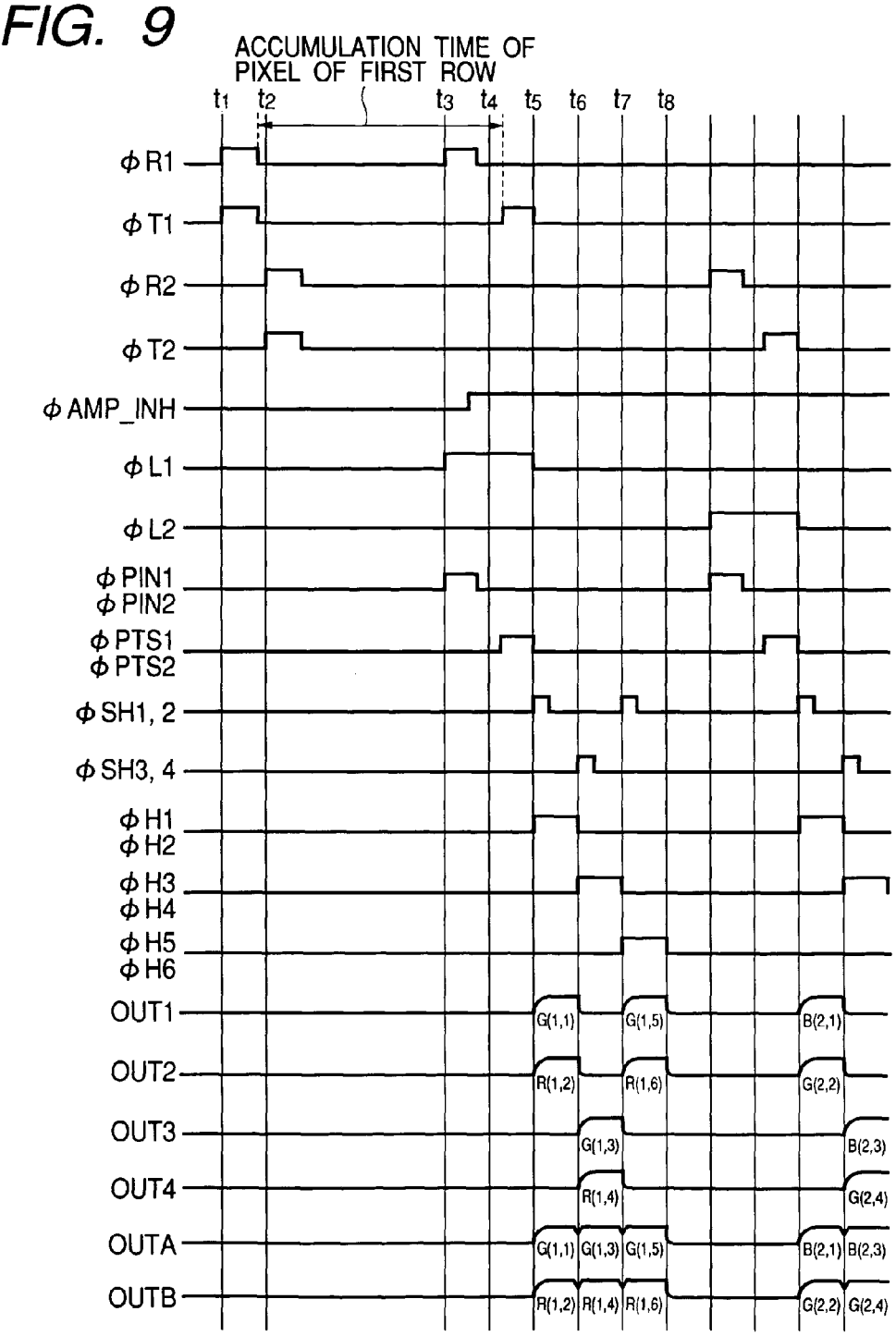

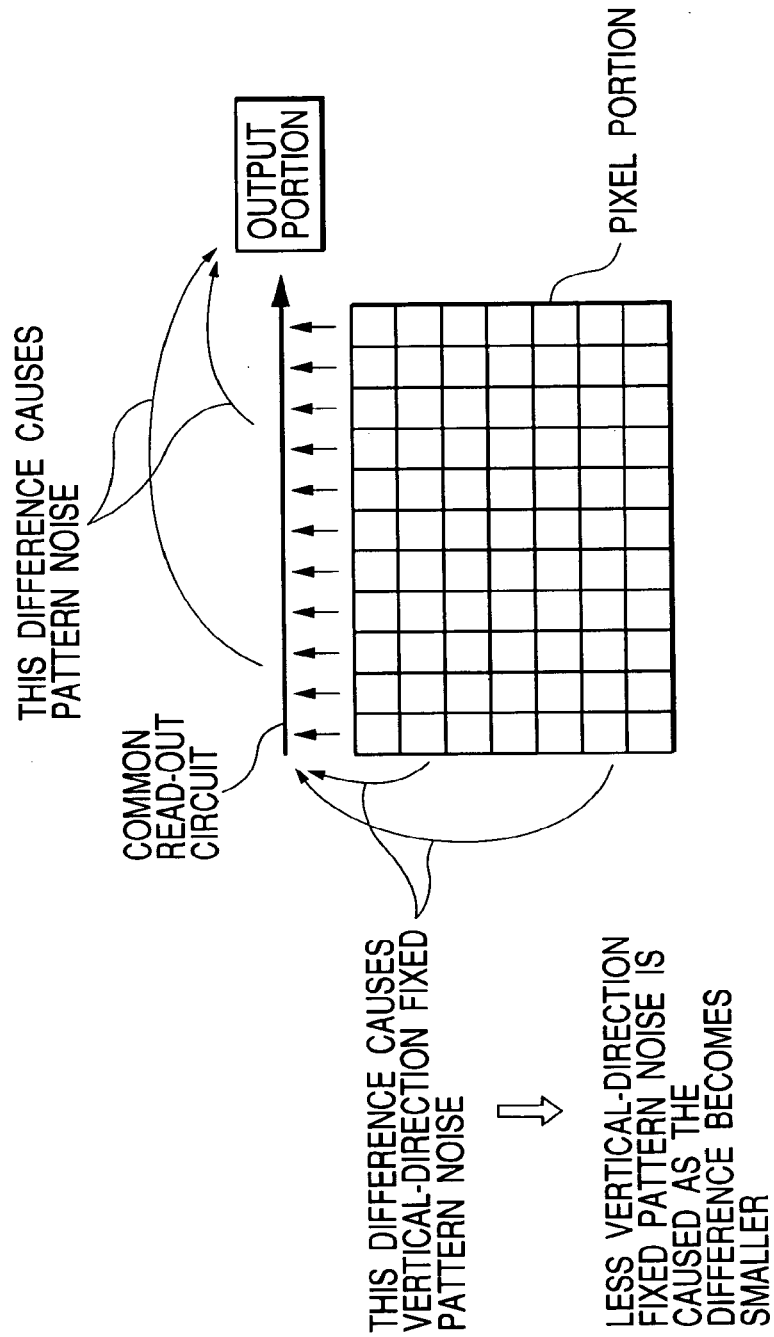

IMAGE PICKUP APPARATUS

This application is a continuation of application Ser. No. 10/661,553 filed Sep. 15, 2003.

BACKGROUND OF THE INVENTION

1. Field of the Invention

The present invention relates to an image pickup apparatus for picking up an object image.

2. Related Background Art

As for this type of image pickup apparatuses in the past, there are those already put on the market, such as an electronic camera with a memory card having a solid-state memory device as a recording medium for recording and reproducing still images and moving images picked up by solid-state image pickup elements such as CCD, CMOS and so on.

In general, this type of image pickup apparatus is comprised of a pixel portion, a read-out circuit portion and an output portion, and is placed on a single substrate (on-chip) for the sake of reducing noise.

As for the image pickup elements in the past, however, since the read-out circuit portion, output portion and pixel portion are on the single substrate, in the case where accumulation time becomes a long time in minutes, heat is generated by the output portion and the like of the image pickup elements, which consume a lot of currents, and dark currents locally increase due to increase of thermal noise and a local temperature rise in the pixels close to the output portion, thereby resulting in lower image quality.

SUMMARY OF THE INVENTION

An object of the present invention is to provide an image pickup element capable of curbing increase of thermal noise and dark currents and picking up a high-quality image.

To attain the object, an aspect of the present invention provides an image pickup apparatus in which a pixel area including arrangement of a plurality of pixels each having a photoelectric conversion portion and a common output portion for sequentially amplifying and outputting signals from the plurality of pixels included in the pixel area are formed on a single semiconductor substrate, comprising: a power supply unit for effecting power supply control of the common output portion independently of control on power supply to the pixel area; and a control circuit for effecting control to supply no power to the common output portion in a predetermined period after starting photo charge accumulation in the photoelectric conversion portion and supply power to the common output portion before the end of a photo charge accumulation period in the photoelectric conversion portion.

Another aspect of the present invention provides the image pickup apparatus in which the pixel area including arrangement of a plurality of pixels each having the photoelectric conversion portion and a common output portion for sequentially amplifying and outputting signals from the plurality of pixels included in the above described pixel area are formed on a single semiconductor substrate, comprising: a power supply unit for supplying a first power level and a second power level lower than the first power level to the common output portion; and a control circuit for effecting control to supply power of the second power level to the common output portion in a predetermined period after starting photo charge accumulation in the photoelectric conversion portion and supply the first power level to the common output portion before the end of the photo charge accumulation period in the above described photoelectric conversion portion.

BRIEF DESCRIPTION OF THE DRAWINGS

FIG. 9 is a diagram showing the operation of the image pickup element in FIGS. 8A and 8B;

FIG. 11 is a diagram for explaining noise of the image pickup element.

DETAILED DESCRIPTION OF THE PREFERRED EMBODIMENTS

Figure 1B:
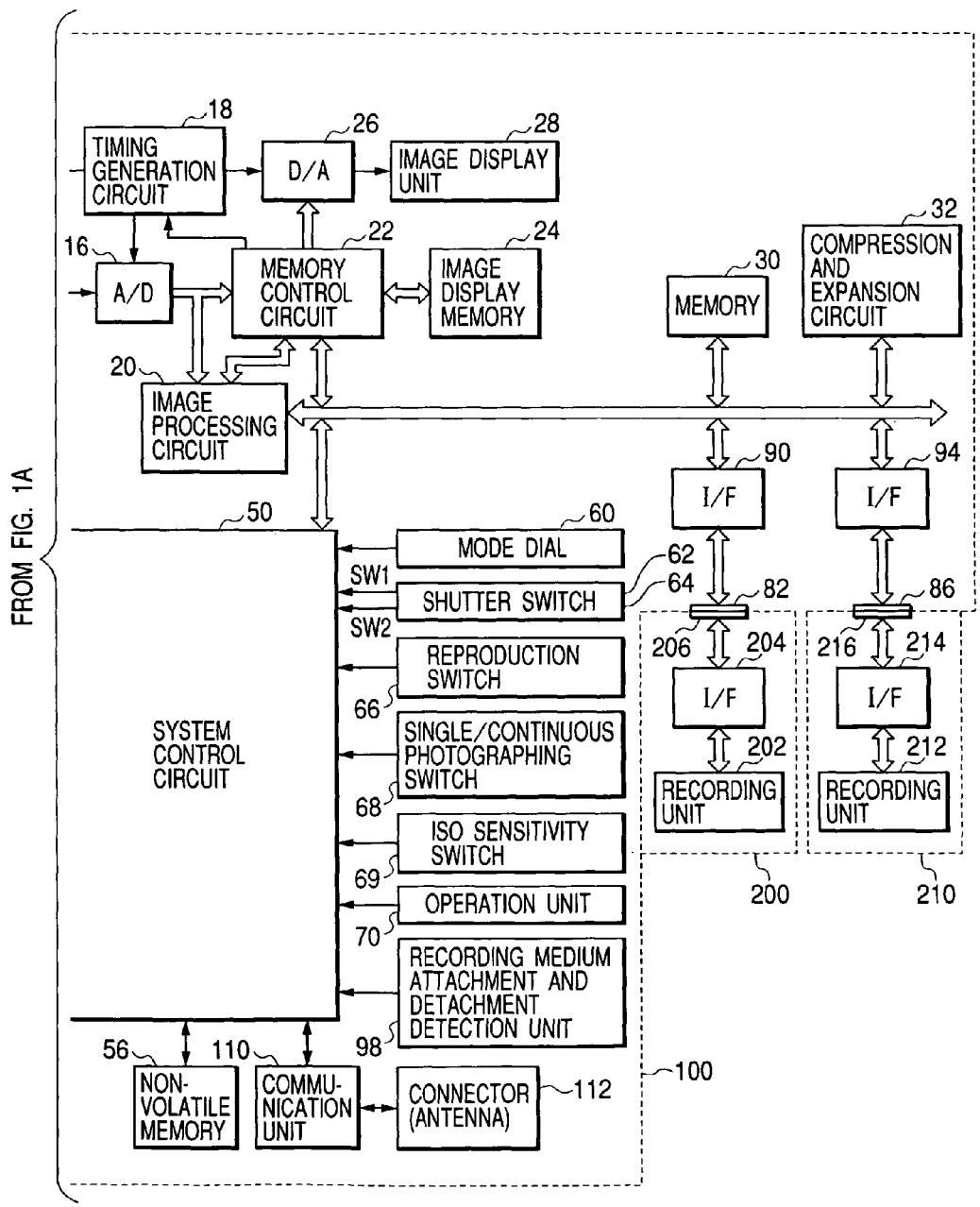
FIG. 1 is comprised of FIGS. 1A and 1B showing block diagrams for a configuration of an electronic camera according to an embodiment of the present invention.
Figure 2:
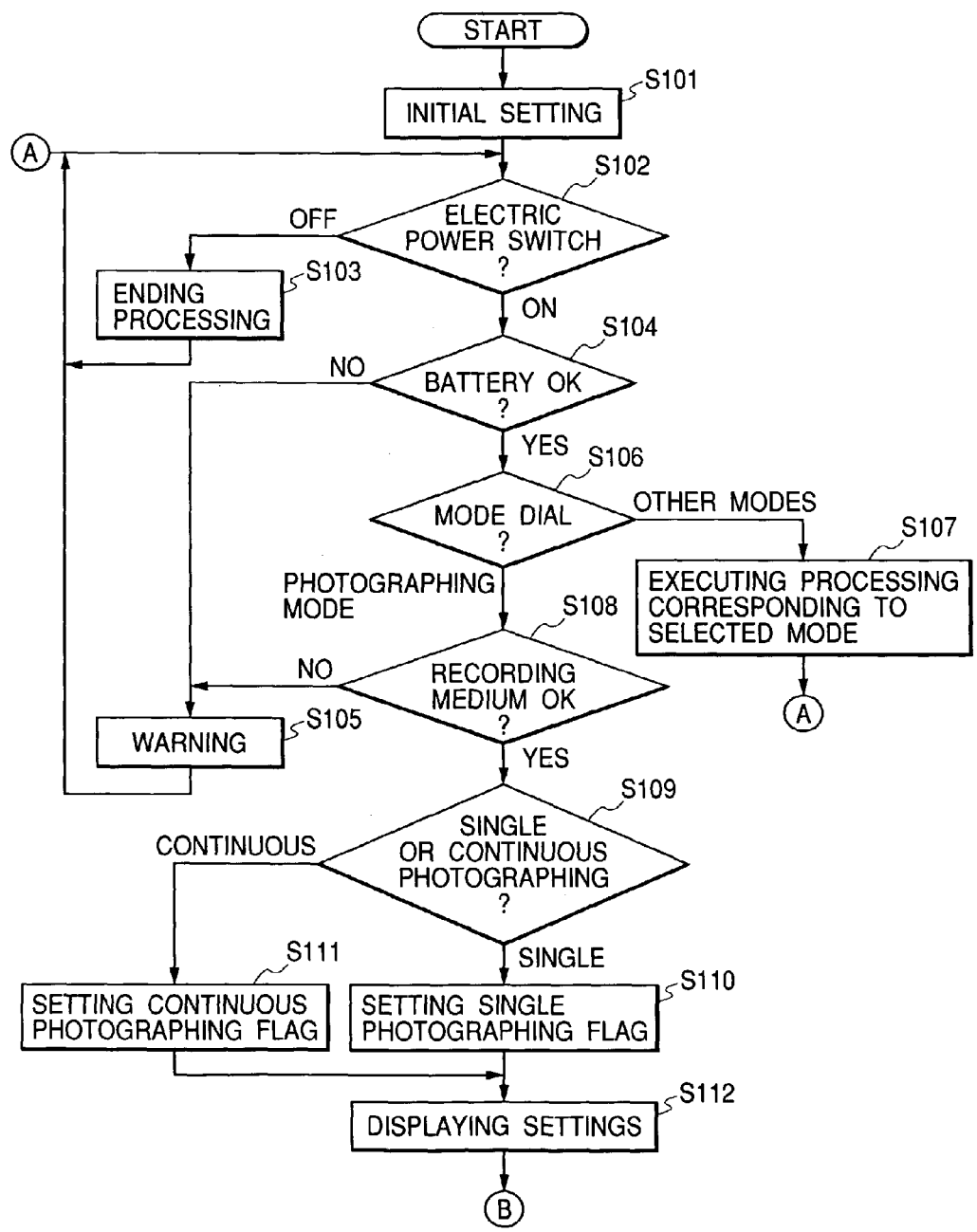
FIG. 2 is a flowchart showing a photographing operation procedure of an image processing apparatus 100.
Figure 3:
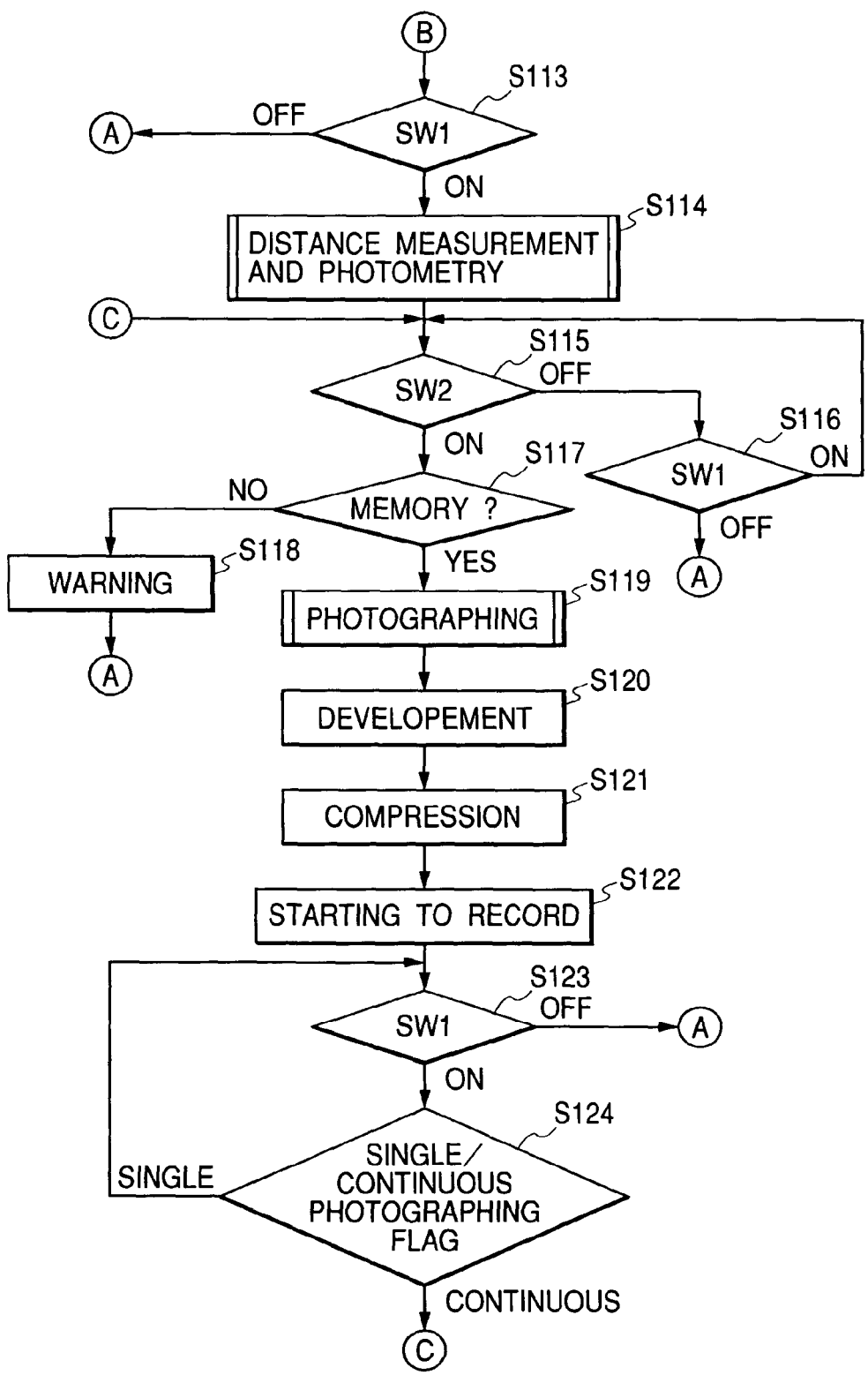
FIG. 3 is a flowchart subsequent to FIG. 2 showing the photographing operation procedure of the image processing apparatus 100.
Figure 4:
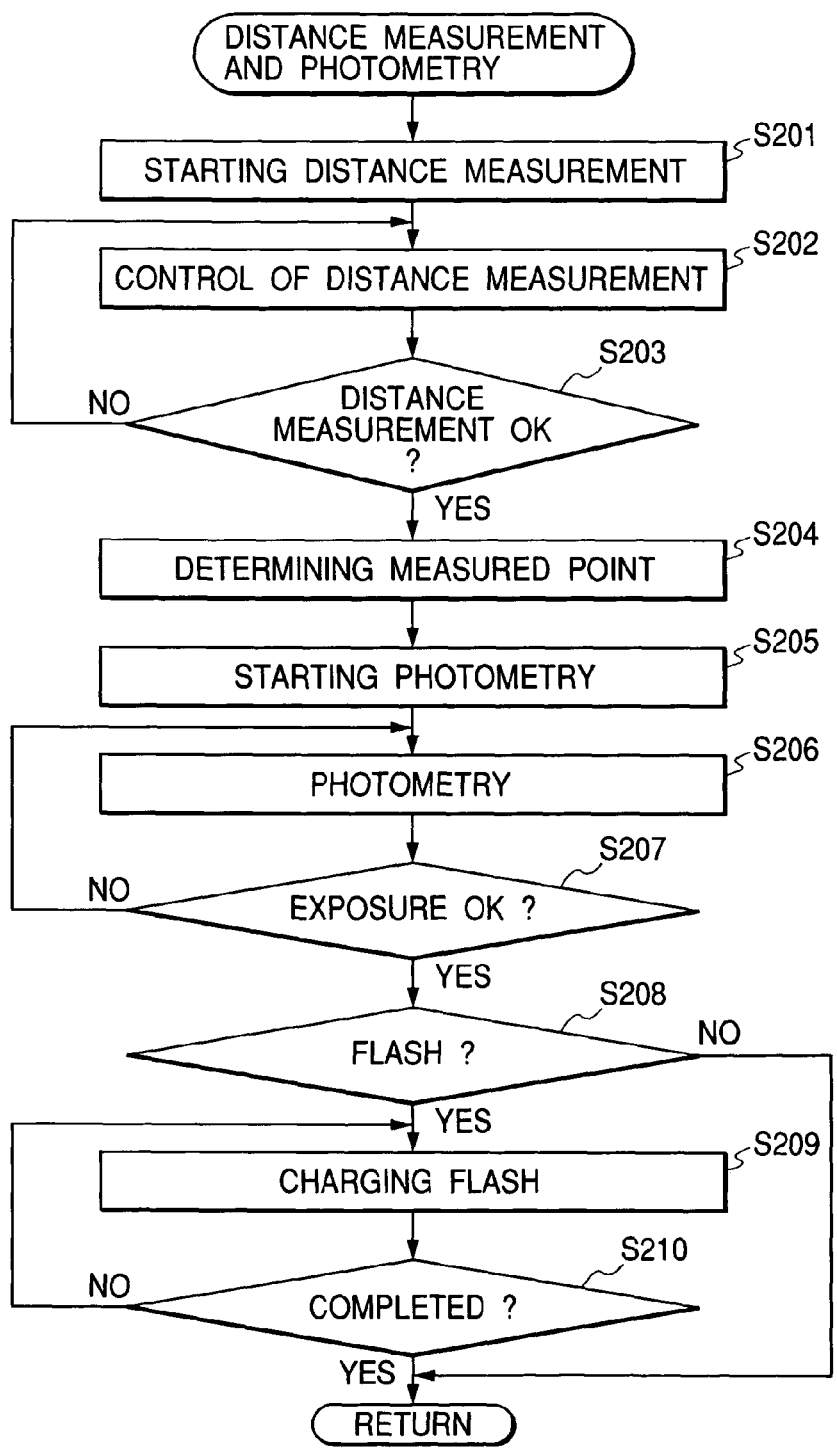
FIG. 4 is a flowchart showing distance measurement and photometry procedures in a step S114.

An image pickup element according to this embodiment will be described by referring to the drawings. An image pickup apparatus according to this embodiment will be applied to an electronic camera.

FIGS. 1A and 1B are block diagrams showing a configuration of the electronic camera according to the embodiment. In FIGS. 1A and 1B, reference numeral 100 denotes an image processing apparatus. Reference numeral 12 denotes a shutter having an iris function of controlling light exposure of an image pickup element 14. Reference numeral 14 denotes the image pickup element which converts an optical image into an electrical signal.

Light incident on a photographing lens 310 in a lens unit 300 is guided by a single lens reflex method through an iris 312, lens mounts 306 and 106, a mirror 130 and a shutter 12 to form an optical image on the image pickup element 14.

Reference numeral 16 denotes an A/D converter which converts an analog signal outputted from the image pickup element 14 into a digital signal. Reference numeral 18 denotes a timing generation circuit for supplying a clock signal and a control signal to the image pickup element 14, A/D converter 16 and D/A converter 26, which is controlled by a memory control circuit 22 and a system control circuit 50.

Reference numeral 20 denotes an image processing circuit which performs predetermined pixel interpolation and color conversion on data from the A/D converter 16 and data from the memory control circuit 22. The image processing circuit 20 performs predetermined calculation by using image data picked up as required, and the system control circuit 50 performs an AF (auto focus) process, an AE (automatic exposure) process and an EF (electronics flash) process of a TTL (through the lens) method for controlling a shutter control unit 40 and a distance measurement control unit 42 based on obtained calculation results. And the image processing circuit 20 performs predetermined calculation by using the image data picked up, and performs an AWB (auto white balance) process of the TTL method based on the obtained calculation results.

According to this embodiment, the distance measurement control unit 42 and a photometry control unit 46 are provided for exclusive use. Therefore, it may have the configuration wherein the system control circuit 50 performs the AF (auto focus) process, AE (automatic exposure) process and EF (electronics flash) process by using the distance measurement control unit 42 and photometry control unit 46 instead of performing these processes by using the image processing circuit 20.

It may also have the configuration wherein the AF (auto focus), AE (automatic exposure) and EF (electronics flash) processes are performed by using the distance measurement control unit 42 and photometry control unit 46, and these processes are further performed by using the image processing circuit 20.

Reference numeral 22 denotes the memory control circuit which controls the A/D converter 16, timing generation circuit 18, image processing circuit 20, image display memory 24, D/A converter 26, memory 30 and compression and expansion circuit 32.

The data from the A/D converter 16 is written into the image display memory 24 or memory 30 via the image processing circuit 20 and memory control circuit 22 or directly into the image display memory 24 or the memory 30 via the memory control circuit 22.

Reference numeral 24 denotes the image display memory and 26 denotes the D/A converter. Reference numeral 28 denotes an image display unit comprising an LCD of the TFT method. The image data for display written to the image display memory 24 is displayed on the image display unit 28 via the D/A converter 26. In the case of displaying the picked-up image data one after another on the image display unit 28, it is possible to implement an electronic finder function. The image display unit 28 can arbitrarily turn on and off the display according to an instruction of the system control circuit 50, so that it can significantly reduce power consumption of the image processing apparatus 100 in the case of turning off the display.

Reference numeral 30 denotes the memory for storing still images and moving images having been shot, and it has a sufficient storage capacity to store a predetermined number of the still images and the moving images for a predetermined time. Therefore, it is also possible to write images into the memory 30 at high speed and by large amounts in the cases of continuously photographing of a plurality of still images or in case of panorama photographing. The memory 30 can also be used as a work area for the system control circuit 50.

Reference numeral 32 denotes the compression and expansion circuit which compresses and expands the image data by adaptively-discrete cosine transfer (ADCT) and so on, and it reads out the images stored in the memory 30 to compress or expand them and writes the processed data into the memory 30.

Reference numeral 40 denotes the shutter control unit which controls the shutter 12 in collaboration with an iris control unit 340 for controlling the iris 312 based on photometric information from the photometry control unit 46. Reference numeral 42 denotes the distance measurement control unit for performing the AF (auto focus) process, and it measures a focusing status of the image formed as the optical image by guiding the light incident on the photographing lens 310 in the lens unit 300 by the single lens reflex method via the iris 312, lens mounts 306 and 106, a mirror 130 and a sub-mirror for distance measurement (not shown).

Reference numeral 44 denotes a thermometer which detects an ambient temperature in a photographing environment. In the case where the thermometer is in the image pickup element (sensor) 14, it is possible to predict the dark currents of the sensor more accurately.

Reference numeral 46 denotes the photometry control unit for performing the AE (automatic exposure) process, which measures an exposure status of the image formed as the optical image by guiding the light incident on the photographing lens 310 in the lens unit 300 by the single lens reflex method via the iris 312, lens mounts 306 and 106, a mirror 130 and the sub-mirror for photometry (not shown). The photometry control unit 46 also has an EF (electronics flash) process function by collaborating with a flash 48. Reference numeral 48 denotes the flash which has a floodlighting function of AF fill light and an electronics flash function.

As previously described, the system control circuit 50 can effect exposure control and AF (auto focus) control of a video TTL method over the exposure (shutter) control unit 40, iris control unit 340 and a distance measurement control unit 342 on the basis of the results calculated by the image processing circuit 20 by using the image data picked up by the image pickup element 14.

It is also possible to effect the AF (auto focus) control by using the results of measurement by the distance measurement control unit 42 and the results of calculation performed on the image data picked up by the image pickup element 14 by the image processing circuit 20. Furthermore, it is also possible to effect the exposure control by using the results of measurement by the photometry control unit 46 and the results of calculation performed on the image data picked up by the image pickup element 14 by the image processing circuit 20.

Reference numeral 50 denotes the system control circuit which controls the entire image processing apparatus 100, and it contains a well-known CPU and so on. Reference numeral 52 denotes a memory which stores constants, variables and programs for operation of the system control circuit 50. Reference numeral 54 denotes a display unit having a liquid crystal display for displaying an operational state and a message by means of characters, images, voice and so on according to execution of the program on the system control circuit 50, a speaker and so on, which is placed at one location or a plurality of locations easily visible and close to an operating unit of the image processing apparatus 100. The display unit 54 is constituted by combining an LCD, an LED, a pronunciation element and so on. Some functions of the display unit 54 are provided inside an optical finder 104.

Of the display contents of the display unit 54, those to be displayed on the LCD and so on include indications of single/continuous photographing, a self-timer, a compression ratio, number of recorded pixels, number of recorded pictures, number of remaining possible pictures, a shutter speed, an iris value, exposure correction, flash, red-eye reduction, macro photographing, buzzer setup, remaining clock battery power, remaining battery power, error, information represented with numbers of two or more digits, mounting statuses of recording media 200 and 210, mounting status of a lens unit 300, communication I/F operation, date and time, and a state of connection with an external computer.

Of the display contents of the display unit 54, those to be displayed on the optical finder 104 include the indications of focusing, completion of photographing preparations, shake alert, flash charging, completion of flash charging, shutter speed, iris value, exposure correction, and writing operation to the recording medium.

Furthermore, of the display contents of the display unit 54, those to be displayed on the LED and so on include the focusing, completion of photographing preparations, shake alert, flash charging, completion of flash charging, writing operation to the recording medium, macro photographing setup notification and secondary battery charging, for instance.

Of the display contents of the display unit 54, those to be indicated by the lamp and so on include a self-timer notification lamp, for instance. The self-timer notification lamp may be shared with the AF fill light.

Reference numeral 56 denotes an electrically erasable and recordable nonvolatile memory storing the programs and so on mentioned later therein, where an EEPROM or the like is used as the nonvolatile memory. The nonvolatile memory 56 stores values such as various parameters and ISO sensitivity, a setting mode and one-dimensional correction data used when performing horizontal dark shading correction stored therein. The one-dimensional correction data is created and stored when adjustment is performed in a production process. As for the method of creating the one-dimensional correction data, there is a method such as performing projective calculation on the image obtained by performing dark photographing to obtain the data equivalent to one line.

As for the correction data, it may be the dark image picked up in the production process and stored as it is as two-dimensional data. However, some image pickup elements have a small vertical fixed pattern noise and thus require only correction in the horizontal direction.

Here, as for an important generation factor of the fixed pattern noise, there are differences (variations) in reading paths through which the signals of the pixel portion reach a final output stage when reading the signals from a circuit system of the image pickup element. FIG. 11 is a diagram showing mixture of the fixed pattern noise in horizontal and vertical directions. The horizontal fixed pattern noise depends on the difference between the reading path of a vertical line a and the reading path of a vertical line b in the drawing. The vertical fixed pattern noise depends on the difference between the reading path of a horizontal line c and the reading path of a horizontal line d in the drawing. For instance, in the case of the image pickup element wherein as shown in FIG. 11, the horizontal lines share the reading path and due to contrivance of a circuit layout and so on, less noise is mixed when transferring the signals of the horizontal lines to a common readout circuit, it is not necessary to correct the vertical fixed pattern noise because it is low. As for the image pickup apparatus using such an image pickup element, it is possible to eliminate the fixed pattern noise by correcting the image by using horizontal one-dimensional correction data.

Reference numerals 60, 62, 64, 66, 68 and 70 denote the operating units for inputting various operational instructions of the system control circuit 50, and they are comprised of a single combination or a plurality of combinations of switches, dials, touch panels, pointing by viewpoint detection, voice recognition and so on. Details of the operating units will be described below.

Reference numeral 60 denotes a mode dial switch which can be set up by switching among functional photographing modes such as an auto photographing mode, a program photographing mode, a shutter speed preference photographing mode, an iris preference photographing mode, a manual photographing mode, a focal depth preference photographing mode, a portrait photographing mode, a landscape photographing mode, a closeup photographing mode, a sport photographing mode, a night view photographing mode and a panorama photographing mode.

Reference numeral 62 denotes a shutter switch (SW1) which is turned on in the middle of the operation of a shutter button (not shown), and it instructs a start of the operations such as the AF (auto focus) process, AE (automatic exposure) process, AWB (auto white balance) process and EF (electronics flash) process and so on.

Reference numeral 64 denotes a shutter switch (SW2) which is turned on at a time of completion of the operation of the shutter button (not shown). The shutter switch (SW2) 64 instructs a start of a series of operations, that is, an exposure process of writing the signal read from the image pickup element 12 as image data to the memory 30 via the A/D converter 16 and memory control circuit 22, a development process using the calculations in the image processing circuit 20 and memory control circuit 22, and a recording process of reading the image data from the memory 30, performing the compression on the compression and expansion circuit 32 and writing the image data to the recording media 200 and 210.

Reference numeral 66 denotes a reproduction switch which instructs a start of a reproduction operation of reading out the image photographed in a photographing mode from the memory 30 or the recording media 200 and 210 and displaying it on the image display unit 28.

Reference numeral 68 denotes a single/continuous photographing switch capable of setting a single mode in which it photographs one frame and then is on standby on pressing the shutter switch SW2 and a continuous mode which performs photographing continuously while pressing the shutter switch SW2.

Reference numeral 69 denotes an ISO sensitivity setting switch which can set ISO sensitivity by changing a gain setting in the image pickup element 14 or the image processing circuit 20.

Reference numeral 70 denotes the operating unit comprised of various buttons and touch panels, including a menu button, a set button, a macro button, a multi-screen reproduction page break button, a flash setup button, a single/continuous/self-timer switching button, a menu movement + (plus) button, a menu movement − (minus) button, a reproduced image movement + (plus) button, a reproduced image − (minus) button, a photographing image quality selection button, an exposure correction button, a date/time setting button, a selection/switching button for setting selection and switching of various functions on photographing and reproducing the panorama mode and so on, a determination/execution button for setting determination and execution of various functions on photographing and reproducing the panorama mode and so on, an image display on/off switch for setting the image display unit 28 on or off, a quick review on/off switch for setting a quick review function for automatically reproducing the shot image data immediately after the photographing, a compression mode switch for selecting a compression rate of JPEG compression or selecting a CCDRAW mode for digitizing the signal of the image pickup element as-is and recording it on the recording medium, a reproduction switch capable of setting various function modes such as a reproduction mode, a multi-screen reproduction/erasure mode and a PC connection mode, and an AF mode setting switch capable of setting a one shot AF mode in which an auto focus operation starts on pressing the shutter switch SW1 and a focusing state is maintained once focus is attained and a servo AF mode in which the auto focus operation is continued while pressing the shutter switch SW1.

As for the functions of the plus button and minus button, it becomes possible to select numerical values and functions more lightly by providing a rotary dial switch.

Reference numeral 72 denotes an electric power switch which can set switching of power-on and power-off modes of the image processing apparatus 100. It can also set switching of power-on and power-off of various auxiliary apparatuses such as the lens unit 300, an external strobe and the recording media 200 and 210.

Reference numeral 80 denotes an electric power control unit comprised of a battery detection circuit, a DC to DC converter, a switch circuit for switching a block to be energized and so on, and it detects whether or not the battery is mounted, a type of the battery and remaining battery power. It controls the DC to DC converter based on the detection results and instructions of the system control circuit 50 so as to supply necessary voltage to the portions including the recording media for a necessary period of time.

Reference numerals 82 and 84 denote connectors, and 86 denotes an electric power unit comprised of a primary battery such as an alkali cell or a lithium battery, a secondary battery such as an NiCd battery, an NiMH battery or an Li battery, an AC adapter and so on.

Reference numerals 90 and 94 denote interfaces to the recording media such as a memory card and a hard disk, and 92 and 96 denote the connectors for making connections to the recording media such as the memory card and hard disk. Reference numeral 98 denotes a recording medium attachment and detachment detection unit which detects whether or not the recording media 200 and 210 are attached to the connectors 92 and 96.

This embodiment has two systems of the interfaces and connectors for attaching the recording media provided thereto. However, a single system or an arbitrary number of the systems of the interfaces and connectors for attaching the recording media may be provided thereto. As for the interfaces and connectors of different standards, those compliant with a PCMCIA card, a CF (Compact Flash®) card and so on may be used.

Furthermore, in the case where it is constituted by using those compliant with a PCMCIA card, a CF (Compact Flash®) card and so on for the interfaces 90 and 94 and the connectors 92 and 96, it is possible to connect various communication cards such as a LAN card, a modem card, a USB card, an IEEE 1394 card, a P1284 card, a SCSI card, and a communication card of PHS and so on so as to mutually transfer the image data and management information attached to the image data between it and another computer and a peripheral such as a printer.

Reference numeral 104 denotes the optical finder which can guide the light incident onto the photographing lens 310 via the iris 312, lens mounts 306 and 106, mirrors 130 and 132 in accordance with the single lens reflex method so as to form an optical image and display it. Thus, it is possible to perform the photographing by using only the optical finder 104 without using an electronic finder function of the image display unit 28. The optical finder 104 has some of the functions of the display unit 54, such as the indications of focusing, shake alert, flash charging, shutter speed, iris value and exposure correction provided therein.

Reference numeral 110 denotes a communication unit which has various communication functions such as RS232C, USB, IEEE 1394, P1284, SCSI, a modem, LAN, radio communication and so on. Reference numeral 112 denotes the connector for having the image processing apparatus 100 connected to another apparatus by the communication unit 110 or an antenna in the case of performing the radio communication.

Reference numeral 120 denotes the interface for connecting the image processing apparatus 100 to the lens unit 300 in the lens mount 106. Reference numeral 122 denotes the connector for electrically connecting the image processing apparatus 100 to the lens unit 300. Reference numeral 124 denotes a lens attachment and detachment detection unit which detects whether or not the lens unit 300 is attached to the lens mount 106 or the connector 122.

The connector 122 conveys the control signal, status signal, data signal and so on between the image processing apparatus 100 and the lens unit 300, and also has a function of supplying the currents of various voltages. The connector 122 may also be constituted to convey optical communication, voice communication and so on in addition to telecommunication.

Reference numerals 130 and 132 denote the mirrors which guide the light incident on the photographing lens 310 to the optical finder 104 in accordance with the single lens reflex method. The mirror 132 may be constituted either as a quick return mirror or as a half mirror.

Reference numeral 200 denotes the recording medium such as the memory card or hard disk. The recording medium 200 has a recording unit 202 comprised of a semiconductor memory, a magnetic disk and so on, an interface 204 to the image processing apparatus 100, and a connector 206 for making a connection to the image processing apparatus 100. Reference numeral 210 denotes the recording medium such as the memory card or hard disk as with the recording medium 200. The recording medium 210 has a recording unit 212 comprised of the semiconductor memory, magnetic disk and so on, an interface 214 to the image processing apparatus 100, and a connector 216 for making a connection to the image processing apparatus 100.

Reference numeral 300 denotes the lens unit of an interchangeable lens type. Reference numeral 306 denotes the lens mount which mechanically links the lens unit 300 to the image processing apparatus 100. The lens mount 306 includes various functions of electrically connecting the lens unit 300 to the image processing apparatus 100 therein.

Reference numeral 310 denotes the photographing lens, and 312 denotes the iris. Reference numeral 320 denotes the interface for connecting the lens unit 300 to the image processing apparatus 100 in the lens mount 306. Reference numeral 322 denotes the connector for electrically connecting the lens unit 300 to the image processing apparatus 100.

The connector 322 conveys the control signal, status signal, data signal and so on between the image processing apparatus 100 and the lens unit 300, and also has a function of having various currents supplied thereto or supplying the currents. The connector 322 may also be constituted to convey an optical signal, an audio signal and so on in addition to the electrical signal.

Reference numeral 340 denotes the iris control unit which controls the iris 312 in collaboration with the shutter control unit 40 for controlling the shutter 12 based on the photometric information from the photometry control unit 46. Reference numeral 342 denotes the distance measurement control unit for controlling the focusing of the photographing lens 310. Reference numeral 344 denotes a zoom control unit for controlling zooming of the photographing lens 310. Reference numeral 350 denotes a lens control circuit which controls the entire lens unit 300. The lens control circuit 350 also has the functions of the memory for storing the constants, variables and programs for the operation and the nonvolatile memory for holding identity information such as a number unique to the lens unit 300, management information, functional information such as an open iris value, a minimum iris value and a focal length, current and past set values and so on.

The operation of the electronic camera having the above configuration will be described. FIGS. 2, 3, 4 and 5 are flowcharts showing a photographing operation procedure of the image processing apparatus 100. This processing program is stored in the storage medium such as the nonvolatile memory 56, and is loaded into the memory 52 to be executed by a CPU in the system control circuit 50.

At power-on such as a battery replacement, the system control circuit 50 initializes flags, control variables and so on, and performs predetermined initialization necessary for each unit of the image processing apparatus 100 (step S101). The system control circuit 50 determines a setting position of the electric power switch 72 so as to determine whether or not the electric power switch 72 is set at power-off (step S102).

In the case where the electric power switch 72 is set at power-off, it performs a predetermined termination process to change the display state of each display unit to an ending state, record necessary parameters, set values and setup modes including the flags and control variables in the nonvolatile memory 56 and shut down unnecessary power of each unit of the image processing apparatus 100 including the image display unit 28 by means of the electric power control unit 80 (step S103), and then returns to the process in the step S102.

In the case where the electric power switch 72 is set at power-on, the system control circuit 50 determines whether or not there is a problem for the operation of the image processing apparatus 100 as to a remaining capacity of the electric power unit 86 such as the battery or its operating status by means of the electric power control unit 80 (step S104). If determined that there is a problem, it gives a predetermined warning to the display unit 54 by displaying the image or outputting the voice (step S105), and returns to the process in the step S102.

If determined that there is no problem as to the electric power unit 86, the system control circuit 50 determines the setting position of the mode dial switch 60 so as to determine whether or not the mode dial switch 60 is set in the photographing mode (step S106). In the case where the mode dial switch 60 is set in another mode, the system control circuit 50 performs a process according to the selected mode (step S107), and then returns to the process in the step S102 thereafter.

In the case where the mode dial switch 60 is set in the photographing mode, it determines whether or not the recording media 200 and 210 are mounted, fetches the management information on the image data recorded on the recording media 200 and 210, and determines whether or not the operational state of the recording media 200 and 210 is problematic to the operation of the image processing apparatus 100, in particular, to the operation of recording and reproducing the image data on the recording media (step S108). If determined that there is a problem, it gives a predetermined warning to the display unit 54 by displaying the image or outputting the voice (step S105), and then returns to the process in the step S102.

If determined that there is no problem in the step S108, the system control circuit 50 checks a selection status of the single/continuous photographing switch 68 for selecting single or continuous photographing (step S109). In the case where the single photographing is selected, a single/continuous photographing flag is set at the single photographing (step S110). In the case where the continuous photographing is selected, the single/continuous photographing flag is set at the continuous photographing (step S111). It is possible to set the single/continuous photographing switch 68 by arbitrarily switching between the single mode in which it photographs one frame and then is on standby on pressing the shutter switch SW2 and the continuous mode which performs continuously photographing while pressing the shutter switch SW2. The state of the single/continuous photographing flag is stored in an internal memory of the system control circuit 50 or the memory 52.

The system control circuit 50 displays various setting statuses of the image processing apparatus 100 with the images and voice by using the display unit 54 (step S112). Here, it is also possible, in the case where an image display switch of the image display unit 28 is ON, to display various setting statuses of the image processing apparatus 100 with the images and voice by using the image display unit 28.

It determines whether or not the shutter switch SW1 is depressed (step S113), and returns to the process in the step S102 in the case where the shutter switch SW1 is not depressed. In the case where the shutter switch SW1 is depressed, the system control circuit 50 performs a distance measurement/photometry process wherein the distance measurement process is performed to focus the photographing lens 310 on an object and the photometry process is performed to determine the iris value and shutter speed (step S114). As for the photometry process, the flash is set up if necessary. Details of the distance measurement/photometry process will be described later.

And it determines whether or not the shutter switch SW2 is depressed (step S115), and in the case where the shutter switch SW2 is not depressed, it determines whether or not the shutter switch SW1 is left free (step S116), and the processing in the step S115 and step S116 is repeated until the shutter switch SW1 is left free or the shutter switch SW2 is depressed. In the case where the shutter switch SW1 is left free in the step S116, it moves on to the process in the step S102.

In the case where the shutter switch SW2 is depressed in the step S115, the system control circuit 50 determines whether or not there is an image-storing buffer space capable of storing the shot image data in the memory 30 (step S117). In the case where it determines that there is no space capable of storing new image data in the image-storing buffer space in the memory 30, it gives the predetermined warning to the display unit 54 by displaying the image or outputting the voice (step S118), and then returns to the process in the step S102.

For instance, the above includes the cases where it is immediately after performing the continuous photographing of the maximum shots storable in the image-storing buffer space in the memory 30, so that the first image to be read from the memory 30 and written to the recording media 200 and 210 are not yet recorded on the recording media 200 and 210 and no free space has been secured yet in the image-storing buffer in the memory 30.

In the case of compressing the shot image data and then storing it in the image-storing buffer space in the memory 30, it is determined by the process in the step S117 whether or not there is the space capable of storing it on the image-storing buffer space in the memory 30 considering that the image data amount after compression differs according to the setting of a compression mode.

In the case where it is determined in the step S117 that there is the image-storing buffer space capable of storing the shot image data in the memory 30, the system control circuit 50 performs a photographing process wherein it reads out image pickup signals accumulated for a predetermined time in image pickup, from the image pickup element 14 and writes the photographed image data into the predetermined space in the memory 30 via the A/D converter 16, the image processing circuit 20 and memory control circuit 22 or directly from the A/D converter 16 via the memory control circuit 22 (step S119). Details of the photographing process will be described later.

When the photographing process in the step S119 is finished, the system control circuit 50 performs a WB (white balance) integral calculation process and an OB (optical black) integral calculation process required to read a part of the image data written to the predetermined space in the memory 30 via the memory control circuit 22 and develop it so as to store the calculation results in the internal memory of the system control circuit 50 or the memory 52.

And the system control circuit 50 reads out the photographed image data written to the predetermined space in the memory 30 by using the memory control circuit 22 and the image processing circuit 20 if necessary, and uses the calculation results stored in the internal memory of the system control circuit 50 or the memory 52 to perform various development processes including the AWB (auto white balance) process, gamma conversion process and color conversion process (step S120).

In the development processes, a dark correction calculation process for canceling dark current noise of the image pickup element 14 and so on is also performed.

The system control circuit 50 reads out the image data written to the predetermined space in the memory 30, performs an image compression process according to the set mode on the compression and expansion circuit 32, and writes the photographed image data undergone the series of processes into the free image space on the image-storing buffer space in the memory 30 (step S121).

And the system control circuit 50 starts the recording process of reading out the image data written to the image-storing buffer space in the memory 30 and writing the read-out image data to the recording media 200 and 210 such as the memory card and Compact Flash® card via the interfaces 90 and 94 and the connectors 92 and 96 (step S122). This recording process is performed on the image data each time the photographed image data undergone the series of processes is written into the free image space on the image-storing buffer space in the memory 30.

While the image data is being written into the recording media 200 and 210, a recording medium writing operation display such as blinking the LED is performed on the display unit 54 in order to indicate that it is in writing operation.

Furthermore, the system control circuit 50 determines whether or not the shutter switch SW1 is depressed (step S123). In the case where the shutter switch SW1 is left free, it returns to the process in the step S102. In the case where the shutter switch SW1 is depressed, it determines the status of the single/continuous photographing flag stored in the internal memory of the system control circuit 50 or the memory 52 (step S124). In the case where the single photographing is set, it returns to the process in the step S123 and the current process is repeated until the shutter switch SW1 is left free. In the case where the continuous photographing is set, it returns to the process in the step S115 in order to photograph continuously and prepares for next photographing. Thus, the series of processes concerning the photographing are finished.

Figure 7:
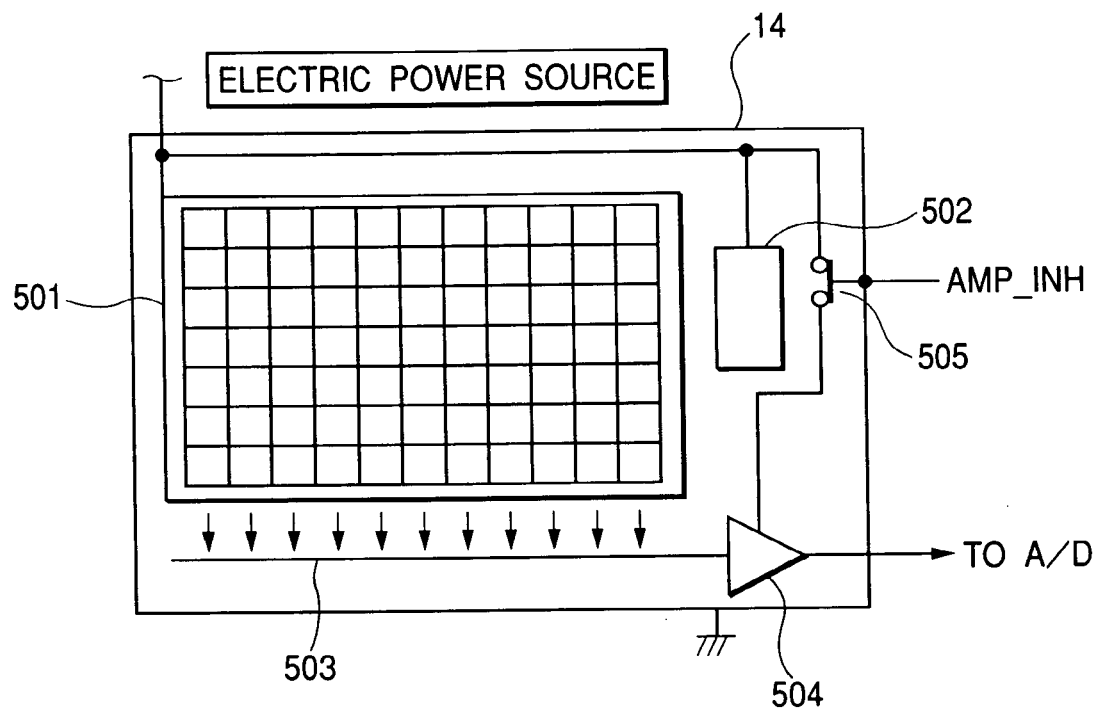
FIG. 7 is a block diagram showing the image pickup element according to this embodiment.

FIG. 7 is a flowchart showing the distance measurement/photometry procedure in the step S114. In the distance measurement/photometry process, exchange of various signals is performed between the system control circuit 50 and the iris control unit 340 or distance measurement control unit 342 via the interface 120, connector 122, connector 322, interface 320 and lens control circuit 350.

The system control circuit 50 starts the AF (auto focus) process by using the image pickup element 14, distance measurement control unit 42 and distance measurement control unit 342 (step S201).

The system control circuit 50 guides into the distance measurement control unit 42 the light incident on the photographing lens 310 via the iris 312, lens mounts 306 and 106, mirror 130 and sub-mirror for distance measurement (not shown) so as to determine the focusing status of the image formed as the optical image. And it performs the AF control for detecting the focusing status by using the distance measurement control unit 42 while driving the photographing lens 310 by using the distance measurement control unit 342 until it determines that the distance measurement (AF) is focusing (step S202, S203).

If determined that the distance measurement (AF) is focusing in the step S203, the system control circuit 50 determines a focusing distance measurement point of a plurality of distance measurement points in the photographing screen, and stores the distance measurement data and/or setting parameters together with the determined distance measurement point data in the internal memory of the system control circuit 50 or the memory 52 (step S204).

Subsequently, the system control circuit 50 starts the AE (automatic exposure) process by using the photometry control unit 46 (step S205). The system control circuit 50 guides into the photometry control unit 46 the light incident on the photographing lens 310 via the iris 312, lens mounts 306 and 106, mirrors 130 and 132 and photometric lens (not shown) so as to measure the exposure status of the image formed as the optical image. And it performs the photometry process by using the exposure (shutter) control unit 40 until it determines that the exposure (AE) is appropriate (step S206, S207).

If determined that the exposure (AE) is appropriate in the step S207, the system control circuit 50 stores the photometric data and/or setting parameters in the internal memory of the system control circuit 50 or the memory 52 (step S207A).

The system control circuit 50 determines the iris value (Av value) and the shutter speed (Tv value) according to the exposure (AE) result detected by the photometry process in the step S206 and the photographing mode set up by the mode dial switch 60.

Here, according to the determined shutter speed (Tv value), the system control circuit 50 determines charge accumulation time of the image pickup element 14, and performs the photographing process in the same determined charge accumulation time.

The system control circuit 50 determines whether or not the flash is necessary according to the measurement data obtained by the photometry process in the step S206 (step S208). In the case where the flash is necessary, it sets a flash flag and charges the flash 48 until charging is completed (step S209, 210). And if the charging of the flash 48 is completed, it finishes this process and returns to the main process.

Figure 5:
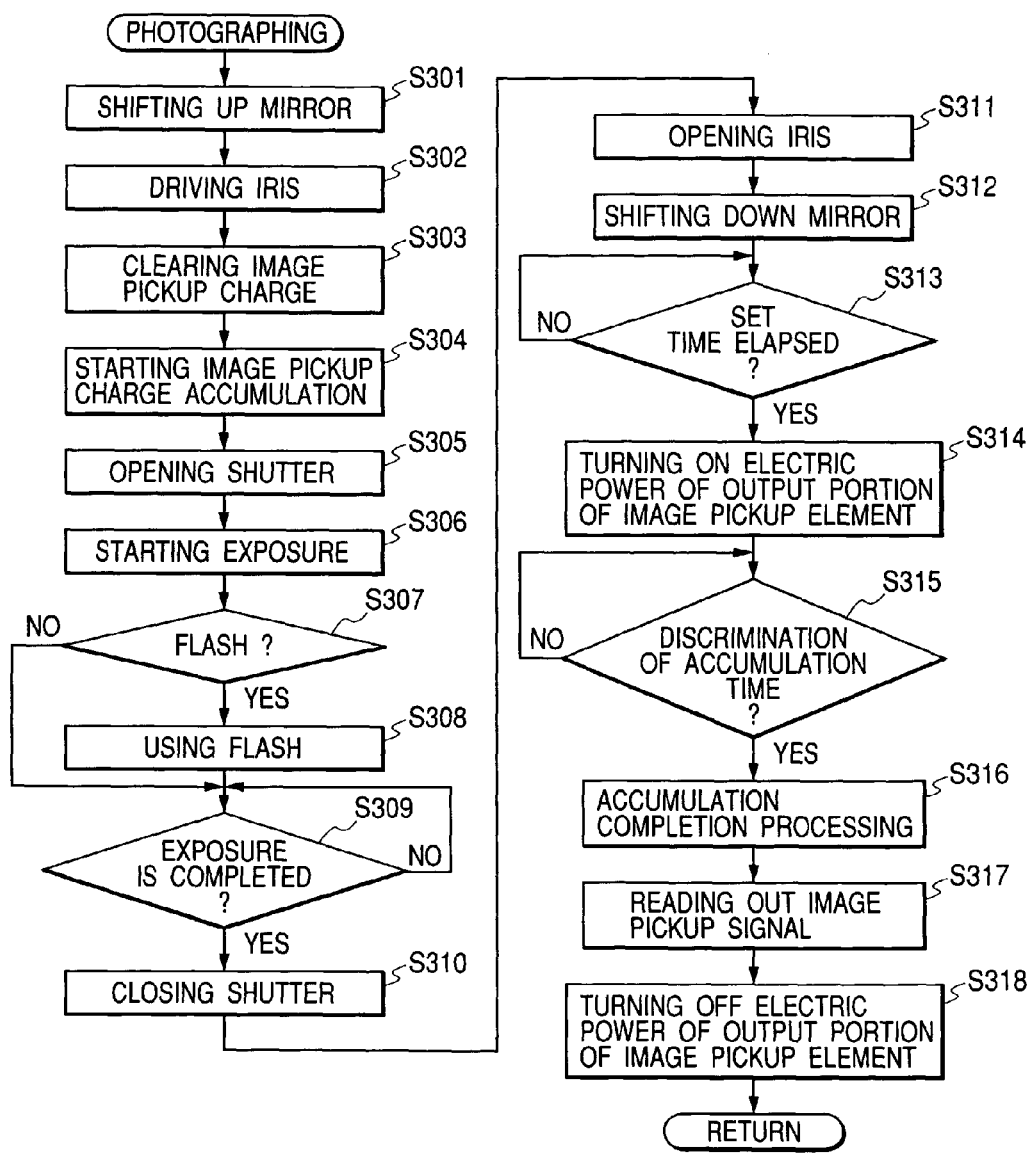
FIG. 5 is a flowchart showing a photographing procedure in a step S128.
Figure 6:
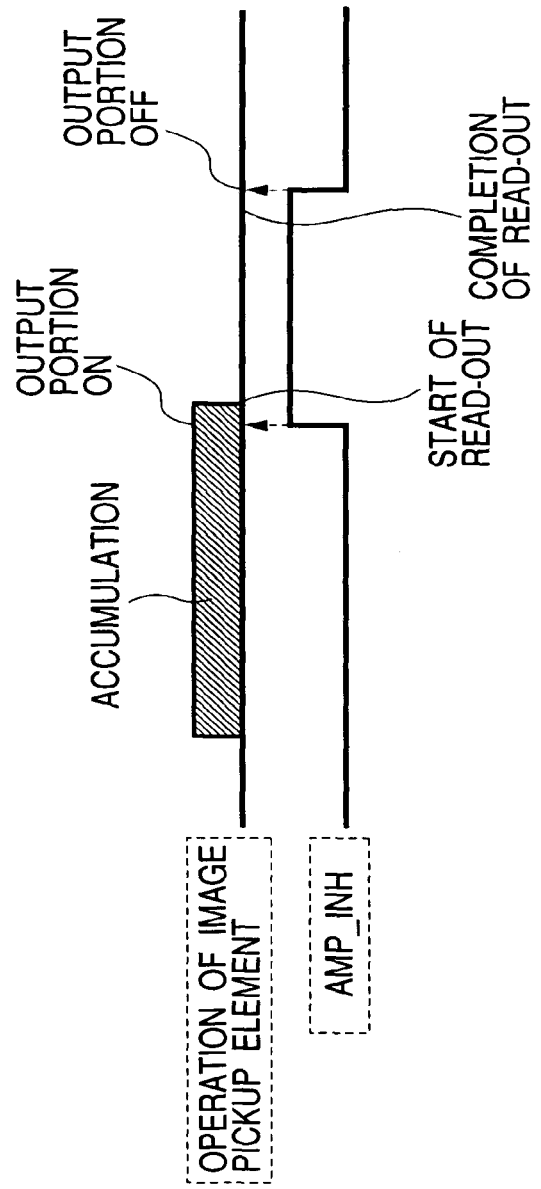
FIG. 6 is a diagram showing an operation of an image pickup element according to this embodiment.

FIG. 5 is a flowchart showing a photographing procedure in the step S119, FIG. 6 is a diagram showing the photographing operation at this time, and FIG. 7 is a block diagram of the image pickup element. Hereafter, the photographing process will be described by using the drawings. In this photographing process, the exchange of various signals is performed between the system control circuit 50 and the iris control unit 340 or distance measurement control unit 342 via the interface 120, connector 122, connector 322, interface 320 and lens control circuit 350.

The system control circuit 50 moves the mirror 130 to a mirror-up position by a mirror driving unit (not shown) (step S301), and drives the iris 312 up to a predetermined iris value by the iris control unit 340 according to the photometric data stored in the internal memory of the system control circuit 50 or the memory 52 (step S302).

After performing charge clearing operation of the image pickup element 14 (step S303), the system control circuit 50 starts charge accumulation of the image pickup element 14 (step S304), opens the shutter 12 by the shutter control unit 40 (step S305), and starts the exposure of the image pickup element 14 (step S306).

And it determines whether or not the flash 48 is necessary according to the flash flag (step S307), and flashes the flash 48 if necessary (step S308).

The system control circuit 50 waits for the end of the exposure of the image pickup element 14 according to the photometric data (step S309). When the exposure is finished, it closes the shutter 12 by the shutter control unit 40 (step S310), and finishes the exposure of the image pickup element 14.

The system control circuit 50 drives the iris 312 up to an open iris value by the iris control unit 340 (step S311), and moves the mirror 130 to a mirror-down position by the mirror driving unit (not shown) (step S312).

Next, it determines whether or not it has reached an on-time of the output portion of the image pickup element (step S313). In the case where it has reached a set time, the system control circuit 50 turns on the power of the output portion of the image pickup element (step S314). Next, it determines whether or not the charge accumulation time has elapsed (step S315). In the case where the set charge accumulation time has elapsed, the system control circuit 50 finishes the charge accumulation of the image pickup element 14 (step S316), and then reads out a charge signal from the image pickup element 14 so as to write signal charges into the predetermined space in the memory 30 via the A/D converter 16, the image processing circuit 20 and memory control circuit 22 or directly from the A/D converter 16 via the memory control circuit 22 (step S317). On finishing the reading-out, it turns off the power of the output portion of the image pickup element (step S318).

Next, a description will be given by using FIGS. 6 and 7 as to the configuration of the image pickup element according to this embodiment, timing for accumulation and reading-out of photo charges, and power-on and power-off of the output portion in the final stage. Reference numeral 14 denotes the image pickup element formed on a single semiconductor substrate by a CMOS process and so on. The image pickup element has a pixel portion 501 in which a plurality of pixels having a photoelectric conversion portion are arranged, a scanning circuit 502 for outputting a timing pulse for reading the signals from the pixel portion, a common read-out circuit 503 for sequentially reading the signals from the pixel portion, the output portion 504 for sequentially amplifying and outputting the signals from the read-out circuit, and a power supply switch 505 for switching between on and off of the power supply to the output portion 504 formed thereon.

Here, a signal AMP_INH in FIG. 6 is the signal issued to the image pickup element directly from the image processing apparatus 100, and the power supply switch 505 is controlled by this signal. During the accumulation, the power is supplied to the pixel portion 501, common read-out circuit 503 and scanning circuit 502 in FIG. 7. The instant at which AMP_INH becomes high corresponds to the timing in the step S314 in FIG. 5, and the power supply switch 505 in the image pickup element is turned on.

Completion of read-out in FIG. 6 corresponds to the step S317 in FIG. 5. And the output portion off in FIG. 6 corresponds to the step S318 in FIG. 5.

If the series of processes are finished, it terminates this process and returns to the main process.

As described above, the power supply switch for allowing the power supply control over the output portion 504 is provided independently of the power supply control over the pixel portion 501 and so on, so that the above operation becomes possible.

Next, the configuration and operation of the image pickup element will be described further in detail by using FIGS. 8A, 8B, 9 and 10.

Figure 8:
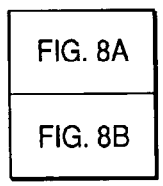
FIG. 8 is comprised of FIGS. 8A and 8B showing diagrams for details of the image pickup element according to this embodiment.
Figure 8A:
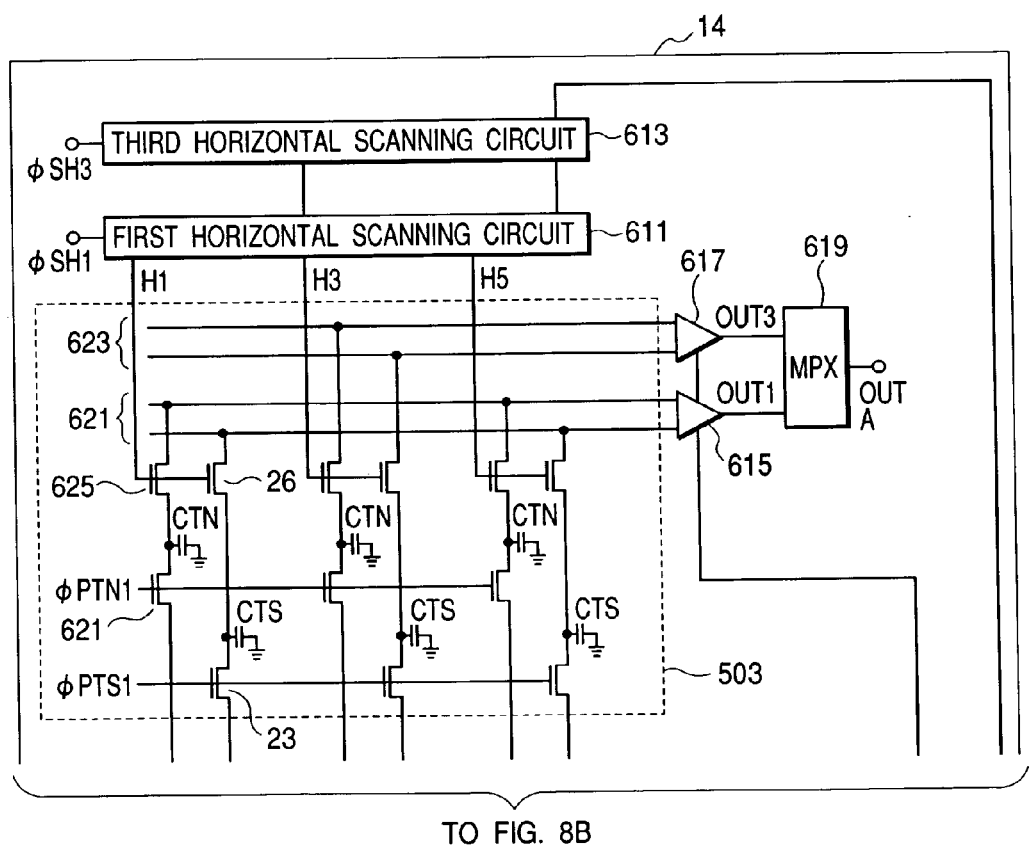
Figure 8B:
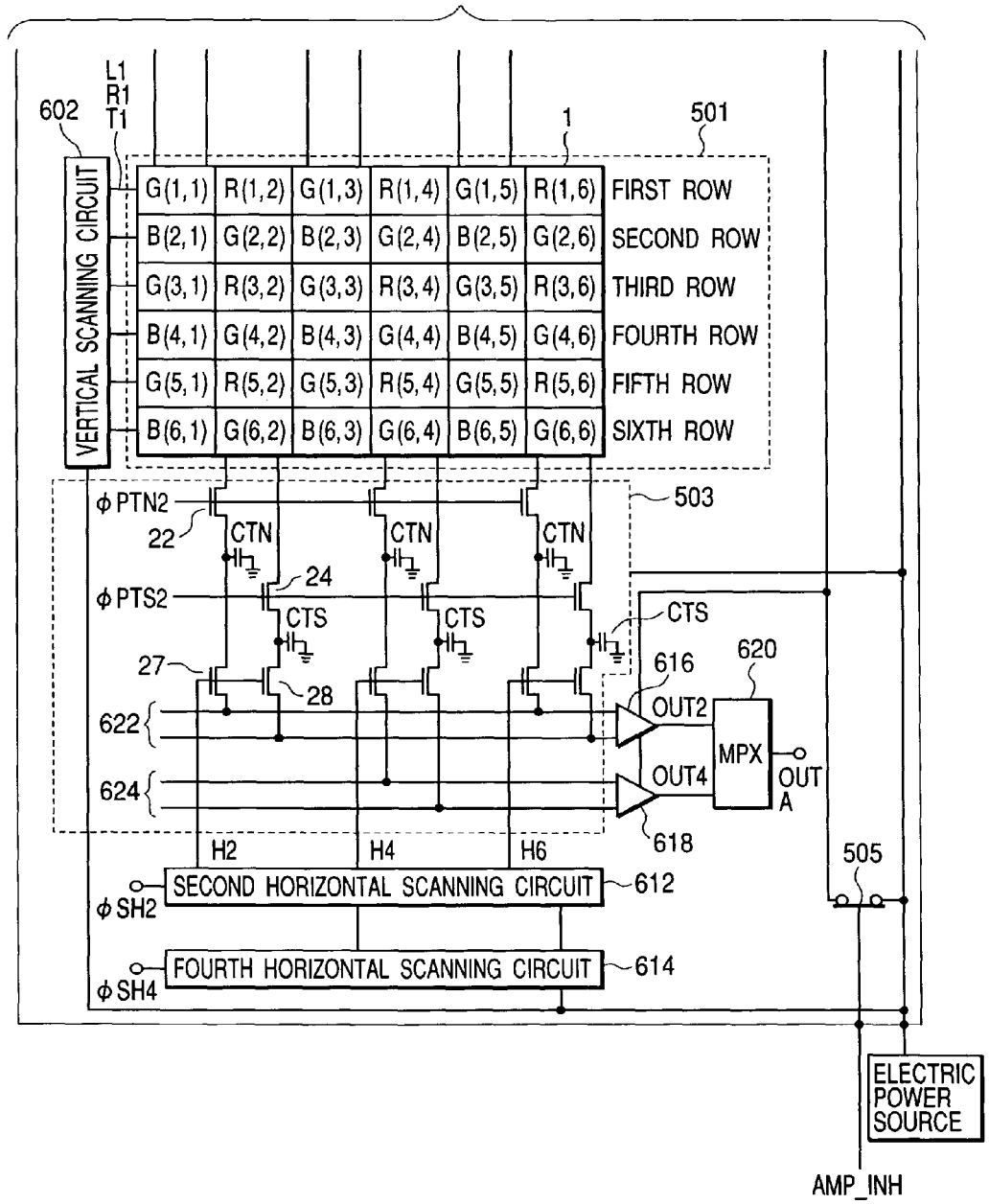
Figure 10:
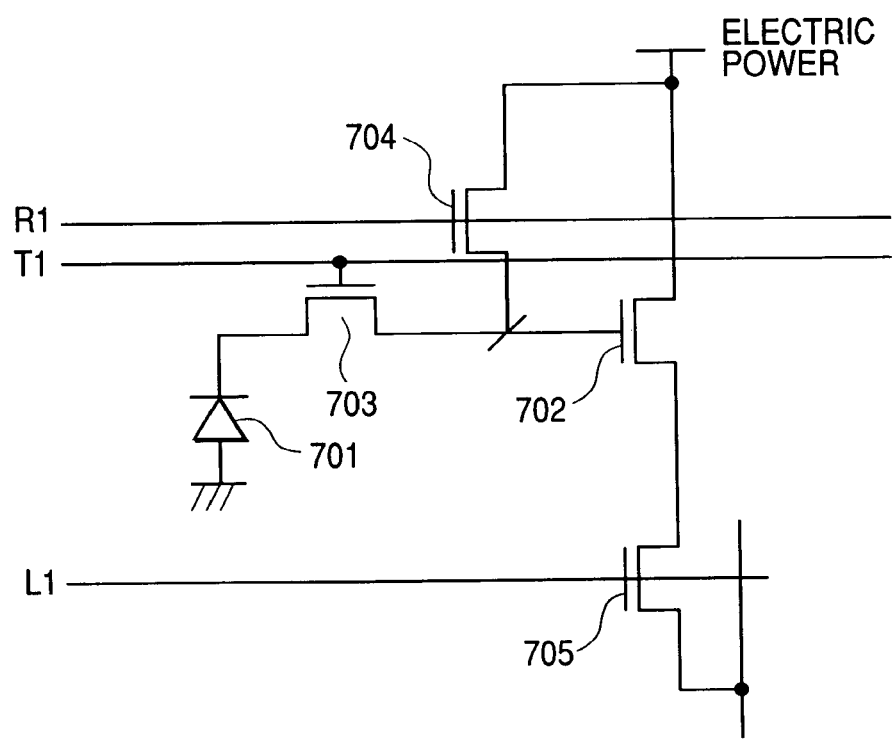
FIG. 10 is a diagram showing one pixel constituting the image pickup element in FIGS. 8A and 8B.

FIGS. 8A and 8B are diagrams showing the configuration of the image pickup element, FIG. 9 is a timing chart showing drive timing and output signals thereof, and FIG. 10 is a diagram showing one pixel of the image pickup element in FIGS. 8A and 8B. Hereafter, a description will be given by referring to FIGS. 8A, 8B and 9.

In FIGS. 8A and 8B, reference numeral 14 denotes the image pickup element formed on a single semiconductor substrate by the CMOS process and so on. Reference numeral 601 denotes the pixel having color filters in a Bayer arrangement, where the numbers in a parenthesis next to R (red), G (green) and B (blue) represent coordinates of the pixels. Here, the case of having the pixels arranged in 6×6 is shown in order to simplify explanation. In reality, however, a considerable number of pixels are arranged in a state of arrays.

As shown in FIG. 10, each pixel 601 includes a photoelectric conversion portion 701, an amplifying transistor 702 for amplifying and reading the signals from the photoelectric conversion portion, a transfer transistor 703 for transferring the signals of the photoelectric conversion portion to the amplifying transistor, a reset transistor 704 for resetting an input portion of the amplifying transistor, and a selection transistor 705 for reading the signals of a selected pixel.

The pixels 601 are connected to row reset lines R1 to R6, row transfer lines T1 to T6 and row selection lines L1 to L6 in each row respectively. And the row reset lines R1 to R6 sequentially become High (hereafter, "H") due to row reset signals supplied from a vertical scanning circuit 602 so that, by sequentially resetting the photoelectric conversion portions in each row ($\phi$R1 to $\phi$R6), photo charge accumulation starts in each row. And the row transfer lines T1 to T6 sequentially become H due to row transfer signals supplied from the vertical scanning circuit 602 so that, by sequentially transferring the charges of the photoelectric conversion portions to the amplifying transistor in each row ($\phi$T1 to $\phi$T6), the photo charge accumulation is sequentially terminated. Furthermore, the row selection lines L1 to L6 sequentially become H due to row selection signals supplied from the vertical scanning circuit 602 so that the row to be read is selected.

The example shown in FIG. 9 represents the case where the row selection signal $\phi$L1 supplied to the row selection line L1 becomes H and the first row is selected (t3). Almost in the same timing for selecting a read-out row and before reading the charges, signals $\phi$PTN1 and $\phi$PTN2 are rendered as H and MOS 621 and 622 are turned on so as to read noise components of the selected row to a capacity CTN. Next, signals $\phi$PTS1 and $\phi$PTS2 are rendered as H and MOS 623 and 624 are turned on (t4), and the photo charges accumulated in each pixel 1 of the selected row are superimposed on the noise components so as to be read to the capacity CTS. Thus, the noise components of each pixel 1 and image signal components superimposed on the noise components are stored in the capacities CTN and CTS respectively.

Next, the charges held by each of the capacities CTN and CTS are transferred to differential amplifiers (output portions) 15 to 18 by column selection signals supplied from first to fourth horizontal scanning circuits 611 to 614 comprised of shift registers and so on. The differential amplifiers 15 to 18 outputs the image signal from which noise components are eliminated by subtracting the noise component from the image signal component superimposed on the noise components.

First, if the first and second horizontal scanning circuits 611 and 612 render φH1 and φH2 as H, the corresponding MOS 625 to 628 are turned on, so that the charges read out from G (1, 1) and R (1, 2) to the capacities CTN and CTS are transferred to the differential amplifiers 615 and 616 via signal lines 101 and 102 respectively (t5). The differential amplifier 615 eliminates the noise components from the photo charges superimposed on the noise components, and outputs the image signal (indicated by the same reference symbol as the pixel. G (1, 1)) (OUT 1). Likewise, the differential amplifier 616 outputs the image signal R (1, 2) (OUT 2). Multiplexers 619 and 620 select the differential amplifiers 615 and 616 and output the image signals G (1, 1) and R (1, 2) respectively.

And in timing of t6, the third and fourth horizontal scanning circuits 613 and 614 render φH3 and φH4 as H, and transfers the charges read from G (1, 3) and R (1, 4) to the capacities CTN and CTS to the differential amplifiers 617 and 618 via signal lines 623 and 624 respectively.

And the differential amplifier 617 eliminates the noise components from the photo charges superimposed on the noise components, and outputs the image signal G (1, 3) (OUT 3). Likewise, the differential amplifier 618 outputs the image signal R (1, 4) (OUT 4). The multiplexers 619 and 620 select the differential amplifiers 617 and 618 this time and output the image signals G (1, 3) and R (1, 4) respectively.

The above operation is repeated by one horizontal line so as to output every other G signal such as G (1, 1), G (1, 3) and G (1, 5) from an output terminal OUTA of the multiplexer 619 and every other R signal such as R (1, 2), R (1, 4) and R (1, 6) from an output terminal OUTB of the multiplexer 620.

Likewise, if φL2 is rendered as H by the vertical scanning circuit 602, a second row is selected and the above operation is repeated by one line so as to output every other B signal such as B (2, 1), B (2, 3) and B (2, 5) from the output terminal OUTA of the multiplexer 19 and every other G signal such as G (2, 2), G (2, 4) and G (2, 6) from the output terminal OUTB of the multiplexer 20.

Here, as for the image pickup element in FIGS. 8A and 8B, it is possible, with the power supply switch 505, to control the power supply to the differential amplifiers 615 to 618 independently of the pixel portion 501, common read-out circuit 503, vertical scanning circuit 602 and first to fourth horizontal scanning circuits 611 to 614.

In the configurations and operations in FIGS. 8A, 8B and 9, the photo charge accumulation is sequentially terminated row by row, and reading is sequentially started row by row.

For that reason, the power supply switch 505 is turned on in order to supply the power to the differential amplifiers 615 to 618 predetermined time earlier (between t3 and t4) than terminating the photo charge accumulation of the pixels in the first row.

Though it is not shown, the power supply switch 505 is turned off after outputting the charges of the pixels in the final row from the differential amplifiers 617 to 618, so that the power is not supplied to the differential amplifiers 617 to 618.

As described above, the power supply switch 505 is turned on in order to supply the power to the differential amplifiers 615 to 618 predetermined time earlier (between t3 and t4) than terminating the photo charges accumulation of the pixels in the first row. Therefore, the differential amplifiers are in a stable state when the signals read from the pixels are inputted thereto. For that reason, there is no need to read out the signals from the pixels after the differential amplifiers become stable so that the processing time can be reduced. In particular, it is effective in the cases of the continuous photographing and moving pictures wherein the images are continuously outputted from the image pickup element.

The above described the embodiment of the present invention. However, the present invention is not limited to this embodiment.

For instance, the power source of the output portion (differential amplifiers) of the image pickup element is turned on and off according to the embodiment. It is also possible, however, to turn on and off the common read-out circuit simultaneously with the output portion.

According to this embodiment, the power source of the output portion of the image pickup element is turned on at the predetermined time immediately before terminating the photo charge accumulation. It is also possible, however, to turn on the power source of the output portion after terminating the accumulation and then start the read-out. In this case, it is also possible to start the read-out after waiting stabilization time of the circuit at power-on of the output portion. Furthermore, it may have the configuration wherein the power source of the output portion is turned on only during the accumulation. In this case, however, the processing time becomes a little longer.

Furthermore, the power supply switch according to this embodiment is controlled by the signal from the outside, that is, the configuration wherein the timing of on and off can be changed by the signal from the outside (configuration capable of variable control). Therefore, it is also possible to perform variable control over the timing for turning on the output portion.

Furthermore, the power source of the output portion is turned on and off according to this embodiment. However, almost the same effect can be obtained by providing a "low current consumption" mode instead of power-off and switching between "on and low current consumption."

To be more precise, the power is supplied to the pixel portion, common read-out circuit and scanning circuits from one terminal (first terminal) and to an output amplifier from another terminal (second terminal) to be able to supply the power to the image pickup element from the two terminals. And the system control circuit 50 exerts control to supply a first power level and a second power level lower than the first power level to the second terminal.

Furthermore, the above embodiment showed the case of switching between the single photographing and continuous photographing by using the single/continuous photographing switch 68. It is also possible, however, to switch between the single photographing and continuous photographing according to selection of an operating mode with the mode dial switch 60.

Furthermore, it is possible, as for the photo charge accumulation in the pixel portion, to provide a long-time mode having long accumulation time and a short-time mode having short accumulation time so as to switch the power source of the output portion in the long-time mode and not to switch it in the short-time mode. To be more specific, it may have the configuration wherein the power is continuously supplied during the photo charge accumulation time.

The above embodiment discloses the case of performing the photographing operation by moving the mirror 130 between the mirror-up position and mirror-down position. It is also possible, however, to constitute the mirror 130 as the half mirror and perform the photographing operation without moving the mirror.

Furthermore, the recording media 200 and 210 may be constituted not only by the memory card such as the PCMCIA card or Compact Flash®, hard disk and so on but also by an optical disk such as a micro DAT, a magnet-optical disk, a CD-R or a CD-RW, or a phase-change optical disk such as a DVD. Furthermore, the recording media 200 and 210 may be a composite medium having the memory card and hard disk as a unit. In this case, it may have the configuration wherein a part of the composite medium is detachable.

According to this embodiment, the recording media 200 and 210 are separate from the image processing apparatus 100, and are arbitrarily connectable. It is also possible, however, to have one or all of the recording media fixed to the image processing apparatus 100. It may also have the configuration wherein an arbitrary number, that is, one piece or a plurality of pieces of the recording media 200 and 210 are connectable to the image processing apparatus 100.

According to this embodiment, the program codes shown in the flowcharts in FIGS. 2 to 5 are stored in an ROM which is the recording medium. As for the recording medium for supplying the program codes, it is not limited to the ROM, but a flexible disk, a hard disk, a nonvolatile memory card and so on may be used.

As described above, according to this embodiment, it is possible, in the image pickup element having the pixel portion and read-out circuit portion on the same substrate, to turn off the power source of the output portion during the accumulation period so as to prevent temperature rise in the image pickup element and prevent degradation of image quality due to increase in thermal noise and dark currents. It is also possible, by rendering the timing for exerting control changeable from the outside, to provide the image pickup element of excellent temperature characteristics capable of easily changing the timing for turning on and off the power source according to length of the accumulation time and ambient temperature. Furthermore, the image pickup element contains the circuit for controlling the power source therein so that the control signals and power supply lines are saved to allow miniaturization of the circuits.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image sensor control apparatus which controls an image sensor in which a pixel area and a common output portion are formed, wherein the pixel area is configured to include a plurality of pixels, each having a photoelectric conversion portion, and the common output portion is configured to amplify and output signals of the plurality of pixels included in the pixel area, said apparatus comprising:

a power supply unit configured to control power supply to the common output portion independently of controlling power supply to the plurality of pixels; and a control circuit configured to switch over power supply control of the power supply unit such that the power supply control is switched to stopping the power supply to the common output portion for a predetermined period in a case where a photo-charge accumulation period of the photoelectric conversion portion is longer than a predetermined value, and the power supply control is switched to continuing to supply the power to the common output portion during the photo-charge accumulation period in a case where the photo-charge accumulation period of the photoelectric conversion portion is shorter than the predetermined value.

2. The image pickup apparatus according to claim 1, wherein said control circuit variably controls the period during which the power supply to the common output portion is stopped.

3. The image pickup apparatus according to claim 1, wherein said power supply unit is formed on a single semiconductor substrate.

4. The image pickup apparatus according to claim 1, wherein the power supply unit continues to supply the power to the common output portion during the photo-charge accumulation period without switching the power supply thereto.

5. An image sensor control apparatus which control a image sensor in which a pixel area and a common output portion are formed, wherein the pixel area is configured to include a plurality of pixels, each having a photoelectric conversion portion, and the common output portion is configured to amplify and output signals of the plurality of pixels included in the pixel area, said apparatus comprising:

a power supply unit configured to control power supply to the common output portion independently of controlling power supply to the plurality of pixels; and a control circuit configured to switch over power supply control of the power supply unit, wherein if a first length of a photo-charge accumulation period is set, the power supply unit stops the power supply to the common output portion for a predetermined period, and wherein if a second length of a photo-charge accumulation period is set, the power supply unit continues to supply the power to the common output portion during the photo-charge accumulation period, wherein the first length of a photo-charge accumulation period is longer than the second length of a photo-charge accumulation period.

6. The image pickup apparatus according to claim 5, wherein said control circuit variably controls the period during which the power supply to the common output portion is stopped.

7. The image pickup apparatus according to claim 5, wherein said power supply unit is formed on a single semiconductor substrate.

8. The image pickup apparatus according to claim 5, wherein the power supply unit continues to supply the power to the common output portion during the photo-charge accumulation period without switching the power supply thereto.

* * * * *